3,546,460
FLUORESCENT MATERIAL FOR WAVELENGTH CONVERSION
Filed Oct. 16, 1967
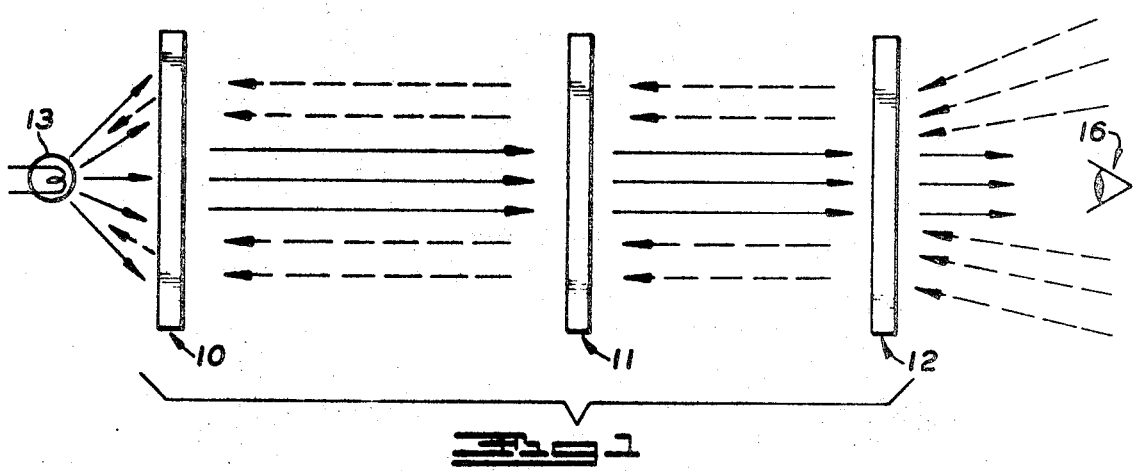
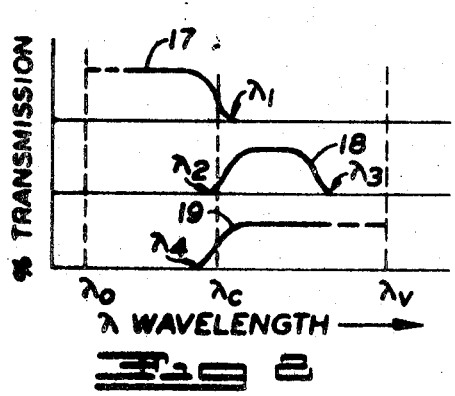
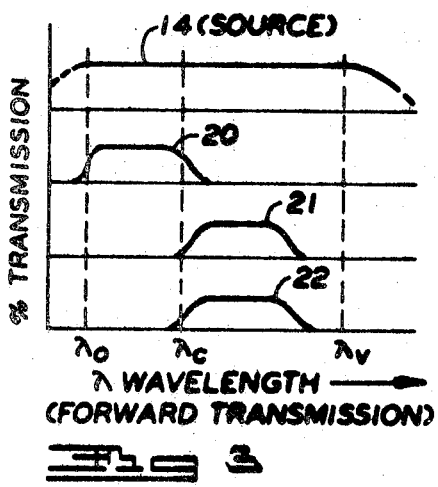
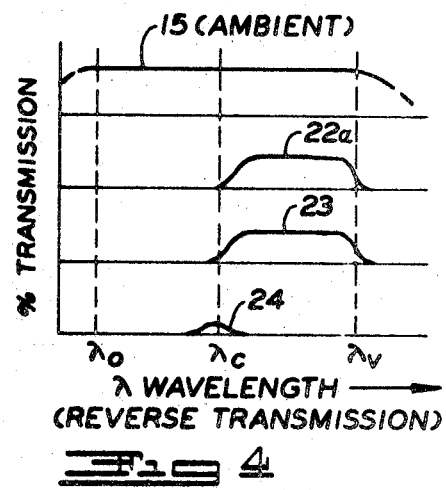
INVENTOR.
KENNETH P. LALLY
BY
MAHONEY, MILLER & RAMBO
ATTORNEYS 3,546,460
NONRECIPROCAL RADIATION FILTER DEVICE HAVING FLUORESCENT MATERIAL FOR WAVELENGTH CONVERSION
Kenneth P. Lally, Smithtown, N.Y., assignor, by mesne assignments, to Hartman Systems Co., Inc., Huntington Station, N.Y., a corporation of Ohio
Filed Oct. 16, 1967, Ser. No. 675,409
Int. Cl. G21h 13/00
U.S. Cl. 250—86
11 Claims

ABSTRACT OF THE DISCLOSURE

Nonreciprocal filtering of radiation is effected by an assembly of filter elements with the several elements transmitting and absorbing radiation in dissimilar wavelength bands and with one filter element also effecting conversion of an absorbed wavelength band to a transmitted wavelength band. Wavelength conversion is effected by fluorescent material excited by incident, absorbed radiation within one wavelength band to emit radiation within the other wavelength band. One filter element only transmits radiation within one wavelength band while another filter element only transmits radiation within the other wavelength band. With these two filter elements disposed at opposite sides of the fluorescent material, radiation will be transmitted through the filter in one direction only since incident radiation in the other wavelength band will be ineffective in exciting the fluorescent material to an emission state, and will be further totally absorbed by the two end filters.

GENERAL DESCRIPTION

Such nonreciprocal filter devices, described herein, may be usefully employed to eliminate diffuse reflections of ambient illumination from display surfaces by being placed over the normal display surface, providing all elements in the nonreciprocal filter device are not diffuse themselves. The device will then serve to absorb all incident ambient radiation before it reaches the original display surface, thus eliminating all possibility of diffuse reflection.

The filter device of this invention is designed primarily for utilization in visual display systems of the type where input radiation forms an image on a viewing screen which is also subject to ambient radiation during the viewing process. These visual display systems, which include projection displays, electroluminescent (E/L) displays, CRT devices, etc., are often of the type including a diffuse optical surface which is used for image formation. Further, the diffuse surface in E/L displays and CRT devices is often a phosphor which is excited by some form of signal radiation to generate the image for viewing. The diffuse surface forming the viewing screen will also be subject to ambient radiation, such as ambient light, which also produces reflections. A major disadvantage of a system having a reflective characteristic is that this reflected ambient light will serve to mask or reduce the effect of the image which is formed by the system. Such an undesirable loss in contrast further detracts from the optimum efficiency of such a visual display system.

For purposes of an example, the present filter device will be considered as related to a visual display apparatus of the CRT type. In a CRT display device, the initial source of radiation comprises an electron gun which provides a source of electrons which are projected onto a phosphor screen with the electron stream being controlled by an input signal. Thus, an image will be formed on a phosphor screen as a result of the excitation of the phosphor particles due to the incident radiation comprising the electrons with the image being controlled by the application of an input signal. An observer thus views an image which is formed as a result of the excitation of the phosphor particles by the incident electron radiation and the phosphor particles convert the incident electron radiation and the phosphor particles convert the incident radiation which is not within the visible spectrum to radiation which is in the visible spectrum. In the normal situation, the viewing screen comprising the phosphors is also subject to ambient radiation which may be in the visible spectrum due to surrounding light conditions or to internal light sources (heater filaments) in the CRT display device. Such ambient radiation will reflect from the diffuse phosphor surface, and thus also produce a visible radiation which is simultaneously viewed with the desired image produced by the electron gun system. An undesired effect of such reflected ambient light or radiation is that the desired image will tend to be masked and the contrast will be substantially reduced as between the portions of the phosphor screen which contains the desired image and remaining portions of the screen which normally should be dark but are illuminated as the result of ambient light reflections.

The simple expedient of inserting a selective filter in the viewing system will not completely alleviate the problem as the normal filter would still transmit ambient radiation which is within the wavelength spectrum transmitted by the filter and this transmitted radiation will thus be incident on the phosphor screen, causing reflections and attendant general illumination of the viewing screen.

The filter device of this invention substantially obviates this problem through the capability of selective directional transmission of radiation, and consequent elimination of diffuse reflections. In its most basic form, the filter device comprises a first filter element which is only capable of transmitting radiation within a first short wavelength band and absorbs all other effective radiation and a second filter element which is only capable of transmitting radiation within a second long wavelength band which is not within the transmission wavelength band of the first filter element. Disposed between the two filter elements is a fluorescent material element which is only responsive to radiation within the first short wavelength band transmitted by the first filter element, i.e., absorbing such short wavelength radiation and subsequently emitting radiation within a longer wavelength band which can be transmitted by the second filter element, but which is substantially absorbed by the first filter element. Thus, net radiation transmission is possible when it starts at the first short wavelength filter element, excites the fluorescent element, and then proceeds through the second longer wavelength filter element. However, a reversal of the above sequence will result in substantially no net radiation transmission. Radiation starting at the second longer wavelength filter element will only have longer wavelength components to which the fluorescent element is not responsive. Therefor, these longer wavelength components will proceed through the fluorescent element substantially unaltered, and will thence be substantially absorbed by the first short wavelength filter. Thus, no net radiation transmission is possible in the reverse direction, and the filter may be used in front of a diffuse image surface and no diffuse reflections will result, if the three elements comprising the non-reciprocal filter are not diffuse (i.e., are polished and transparent). Ambient radiation will not be transmitted to the radiation source (the diffuse surface) and the illumination transmitted for visual observation will only be that produced by the radiation source and the contrast will be greatly enhanced for optimum viewing.

These and other objects and advantages of the present invention will be readily apparent from the following detailed description of an embodiment thereof and the accompanying drawings.

In the drawings:

FIG. 1 is a diagrammatic representation of a filter device embodying this invention with the several filter elements separated for clarity of illustration of the radiation transmission wavelength bands.

FIG. 2 is a graphic illustration of the relative radiation transmission wavelength bands of the several filter elements of the filter device shown in FIG. 1.

FIG. 3 is a graphic illustration of the radiation transmission of the filter device in a forward direction.

FIG. 4 is a graphic illustration of the radiation transmission of the filter device taken in a reverse direction.

Referring to the drawings, FIG. 1 illustrates an embodiment of the invention that includes three filter elements 10, 11 and 12 which are respectively designated as the first, second and third filter elements. These three filter elements 10, 11 and 12 comprise sheet form structures which may be substantially coextensive with each other and which are supported in superposed relationship. Although the three elements are shown in relatively spaced parallel, planar relationship, for clarity in describing the radiation transmission, these elements may be supported in adjacent contacting engagement and thus form a more compact structure. Whether the elements are spaced or positioned in surface contacting engagement, a structural requirement of the filter device is that ambient light be excluded or perverted from incidence with any filter element other than that filter element which forms a viewing face, which in this instance, is the filter element 12 appearing at the extreme right of FIG. 1. This requirement is fully met when the elements are placed in contacting engagement and thus obviates the necessity for other structural elements designed to exclude such ambient radiation or light. However, where the filter elements 10, 11 and 12 are relatively spaced, as shown in FIG. 1, it will be necessary to support the several filter elements within a structure which is capable of excluding such ambient radiation. Such constructional techniques are well known and, therefore, are not further described or illustrated.

In FIG. 1, a light source 13 which forms a radiation source for purposes of illustration, is supported relative to the first filter element 10 in such a position that the radiation emanating therefrom will be incident upon this filter element. Accordingly, the filter element 10 may be referred to as the input filter element of this filter device. For purposes of illustration, it is assumed that the light source 13 may emit radiation which encompasses a relatively broad wavelength spectrum that may be defined as extending from the wavelength $\lambda_0$ to $\lambda_v$. It is advantageous to the total efficiency of this invention if a significant portion of the power of light source 13 is contained in the short wavelength end of the spectrum, near $\lambda_0$ (ultraviolet, blue, green). It is also assumed for purposes of illustration that the ambient radiation spectrum also encompasses the same wavelength spectrum band of $\lambda_0$ to $\lambda_v$. The source and ambient wavelength spectrum are graphically illustrated in the respective FIGS. 3 and 4 and are represented by the uppermost waveforms designated 14 and 15, respectively. The third filter element 12 is considered as the viewing face of the filter device and an observer illustrated diagrammatically at 16 would view the exterior surface of this filter element.

The first filter element 10 may be formed from a suitable glass material and fabricated as a planar sheet which possesses adequate structural rigidity for the filter device. Materials utilized in the fabrication of the first filter element 10 are selected to provide a selected radiation transmission band within the wavelength spectrum in which the filter device is designed to function. Further, the first filter element 10 has a transmission characteristic having a waveform 17 substantially as shown in FIG. 2 such that it is absorptive of substantially all radiation having wavelengths outside of the transmission band and within the defined wavelength spectrum. Preferably, the selected material transmits radiation of wavelengths within a first wavelength band comprising a portion of the wavelength spectrum $\lambda_0-\lambda_v$ and extends from the wavelength $\lambda_0$ to an intermediate wavelength $\lambda_1$. In the illustrative embodiment, the transmitted wavelength band $\lambda_0-\lambda_1$ comprises the relatively shorter wavelengths of the wavelength spectrum $\lambda_0-\lambda_v$ with the relatively longer wavelengths $\lambda_1-\lambda_v$ being substantially absorbed by the material. Optimally, the transmission characteristic of this material would have a relatively sharp cut-off between the transmission and absorptive wavelength bands and may be considered for purposes of illustration as having a cut-off wavelength $\lambda_c$ at which point effective transmission is assumed to be terminated. As a result of the appropriate selection of the material utilized in fabrication of the first filter element 10, radiation having wavelengths within the wavelength band $\lambda_0$ to $\lambda_c$ may be considered as transmitted by the first filter element and all other wavelengths of radiation which may be emitted by the first filter element and all other wavelengths of radiation which may be emitted by the source 13 will be effectively completely attenuated or absorbed by the first filter element.

The second filter element 11 constitutes a fluorescent material which is characterized by having a radiation emission spectrum band with an effective waveform 18 substantially as shown in FIG. 2 and which may include the wavelength band extending from $\lambda_2$ to $\lambda_3$. This emission wavelength spectrum of the fluorescent material is preferably entirely within the absorptive wavelength band $\lambda_1-\lambda_v$ of the first filter element 10. The fluorescent filter element 11 is substantially absorptive of all radiation wavelengths which are within the transmission band of the first filter element 10. The effective cut-off wavelength of the emission spectrum is at least coincident with the wavelength $\lambda_c$ and is preferably displaced to the right of the diagram in FIG. 2 to be more fully within the absorptive spectrum or wavelength band of the first filter element. The characteristic of the fluorescent material utilized in fabricating the second filter element 11 is that radiation of relatively shorter wavelengths which are absorbed, and in this instance are also transmitted by the first filter element 10, are effective in exciting the fluorescent material to emit radiation having wavelengths within the indicated wave band 18. This change in wavelengths of radiation absorbed and that emitted is generally described by Stoke's law and is in accord with the energy conservation principle since the relatively longer wavelengths emitted will be of a relatively lower energy level.

With the second filter element 11 being effectively absorptive of radiation of all wavelengths other than that within the emitted radiation as defined by the waveform 18, it will be seen that only radiation originating in the wavelengths within the transmission spectrum 17 of the first filter element 10 and converted to radiation within the emission spectrum 18 of the fluoroescent element 11 will be transmitted to the right of FIG. 1 through the combination of filter elements and observed at the opposite face of the second filter element. It will be virtually impossible for radiation of wavelengths in the spectrum $\lambda_0-\lambda_v$ to be transmitted in the opposite direction and observed at the face of the first filter element 10 which is exposed to either a viewer or a diffusely reflecting surface. A general characteristic of fluorescent materials is that the radiation emission spectrum is generally coincident with the radiation transmission band; however, radiation of wavelengths within this spectrum will not be transmitted in a reverse direction through the filter combination since the absorptive wavelength spectrum of the first filter element 10 will effectively block or prevent transmission of radiation within this wavelength band. Furthermore, the radiation within the spectrum of the emission band 18 will normally be of an energy characteristic lower than that necessary to excite the fluoroescent emission in the material and, therefore, no emission in wavelength other than that previously considered will be observed.

The third filter element 12 is fabricated from a suitable material in sheet form having a radiation transmission characteristic substantially as shown by the waveform 19 in FIG. 2. The transmission band wavelengths, as indicated by the waveform 19, extend from an effective wavelength $\lambda_4$ to substantially the wavelength $\lambda_v$ of the wavelength spectrum for which the filter device is designed to function and this element will thus be seen to be substantially absorptive of all radiation wavelengths which are within a shorter wavelength band such as may be transmitted by the first filter element 10. Since it has been specified that the second filter element 11 and the fluorescent material which it comprises are absorptive of wavelengths within the wavelength spectrum $\lambda_0-\lambda_4$, and will be stimulated into fluorescence by such wavelengths, the third filter element 12 will be effective in not only preventing transmission of radiation wavelengths within the transmission band 17 of the first filter element 10 in a rearward direction but will prevent ambient radiation of this wavelength from being incident upon the fluorescent material of the second filter element 11 and thereby exciting the fluorescent material to emit radiation in the wavelength band 18.

The third filter element transmission characteristic 19, as indicated in FIG. 2, is capable of transmitting radiation of wavelength beginning at $\lambda_4$; however, the effective transmission band is substantially coincident with the cut-off wavelength $\lambda_c$. If desired, this selected transmission characteristic may be such that the transmitted wavelength limit $\lambda_4$ may be displaced a distance to the right in the wavelength spectrum to further enhance the filtering effect. However, this may tend to reduce the effective transmission of emitted radiation from the fluoroescent material in the second filter element 11.

Specific materials utilized in the fabrication of the several filter elements are not set forth in this specification as the selection of these materials will be determined by the particular application for a filter device constructed in accordance with the principles of this invention. Selection of the materials will be determined upon consideration of the specific radiation source 13 and the ambient viewing conditions which will be encountered.

Operation of the filter device described in conjunction with FIGS. 1 and 2 is illustrated in FIGS. 3 and 4. In FIG. 3, the transmission effect of the filter device is considered as to the forward transmission characteristics of the device. By forward transmission characteristics, it is intended to infer that the device will be functioning as normally intended and defines the radiation transmitted from the radiation source at 13 to the viewing face of the filter device as may be observed by an observer stationed at 16. These depicted transmission characteristics are based on the assumption that each of specific filter elements has a relatively sharp cut-off wavelength and that the image radiation as to any particular filter element will be substantially unattenuated whereas the ambient radiation bands will be effectively fully attenuated. It will be understood that in a practical filter device such optimum characteristics will be impossible to attain and, accordingly, practical devices will have attenuations in the absorptive and transmissive bands to a degree which is somewhat less than the optimized attenuation characteristic.

Referring specifically to FIG. 3, it is assumed that the radiation source 13 emits radiation within the spectrum effectively defined with the wavelengths $\lambda_0-\lambda_v$. This emitted radiation, which is incident upon the first filter element 10, would only be transmitted by this first filter element to the extent indicated by the waveform 20. Thus, the radiation incident on the second filter element 11 will be limited to that radiation having wavelengths within the wavelength band $\lambda_0-\lambda_c$. As previously defined, the wavelength $\lambda_c$ is considered as the effective cut-off wavelength of this particular transmission band. The fluorescent material which the second filter element 11 includes is responsive to at least a part of the radiation wavelentghs in this transmitted band, if not all, and as a result is excited to emit radiation having wavelengths as defined by the waveform 21. By definition, the first filter element 10 is restricted to a transmission band which is terminated at $\lambda_c$ and is substantially absorptive upon all radiation wavelengths within the wavelength band $\lambda_c-\lambda_v$. The fluorescent material of the second filter element 11, however, emits radiation only within the wavelength band which is defined by the spectrum $\lambda_c-\lambda_v$ and then emits only in response to incident radiation in the first wavelength band $\lambda_0-\lambda_c$. Thus, radiation will only be transmitted by the first and second filter element combination which is effectively within the first wavelength band $\lambda_0-\lambda_c$ although the radiation exiting this filter combination is of a wavelength within that portion of the spectrum $\lambda_c-\lambda_v$, or second wavelength band. Transmission of radiation will only proceed in a forward direction through the filter combination since ambient radiation of wavelengths within the spectrum $\lambda_0-\lambda_v$ and incident to the exit face of the second filter element 11 will either be absorbed by the second filter element if within the first wavelength band $\lambda_0-\lambda_c$ or by the first filter element 10 if within the second wavelength band $\lambda_c-\lambda_v$. However, ambient radiation of wavelengths within the first wavelength band $\lambda_0-\lambda_c$ incident to and absorbed by the second filter element 11 may also result in excitation of the fluorescent phosphors with consequent emission of radiation of wavelengths within the second wavelength band $\lambda_c-\lambda_v$ at the exit face of the second filter element. When the filter device also includes a third filter element 12, the transmission band of which is included within the second wavelength band $\lambda_c-\lambda_v$, that portion of incident ambient radiation of wavelengths within the first wavelength band $\lambda_0-\lambda_c$ will be absorbed by the third filter element. Radiation of wavelengths within the second wavelength band $\lambda_c-\lambda_v$ and emitted by the fluorescent material of the second filter element as defined by the waveform 21 of FIG. 3 will be transmitted through the third filter element 12. Since the fluorescent material forming the second filter element 11 is only excited into emission by incident radiation of wavelengths within the first wavelength band $\lambda_0-\lambda_c$ ambient radiation of wavelengths within the spectrum $\lambda_0-\lambda_c$ and incident to the exit face of the third filter element will be ineffective in producing reflection through excitation of the fluorescent material and will not be transmitted in a reverse direction through the filter combination.

The ineffectuality of ambient radiation on a filter device of this invention is graphically illustrated in FIG. 4. In this diagram, ambient radiation is assumed to also comprise the wavelength spectrum $\lambda_0-\lambda_v$ and is incident on the viewing or exit face of the third filter element 12. Since the third filter element 12 has a transmission wavelength band $\lambda_c-\lambda_v$, only radiation of wavelengths within this band and having the illustrative waveform 22a will be incident upon the second filter element 11. The second filter element 11 also has a transmission wavelength band $\lambda_c-\lambda_v$ and will thus transmit ambient radiation of wavelengths within this wavelength band and illustrated by waveform 23 to the first filter element 10. However, the first filter element 10 is essentially absorptive of radiation having wavelengths with in this band and thus will not transmit this portion of the radiation. Due to the decreased effectiveness of the specific filter elements in the region of the defined cut-off wavelength $\lambda_c$, there may be a small amount of radiation transmitted, although such transmitted radiation will be greatly attenuated and may have a waveform as depicted at 24. This will, to a large degree, be determined by the degree of overlap designed into the filters at $\lambda_c$.

It will be readily apparent that a novel nonreciprocal optical filter is provided by this invention. This filter is capable of limiting transmission, through the filter, to one direction only and is thus particularly effective in applications where ambient radiation would normally produce an adverse effect as ambient radiation will be effectively excluded.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A radiation filter device possessing nonreciprocal characteristics for unidirectional transmission of radiation within a wavelength spectrum $\lambda_0-\lambda_v$ comprising, in superposed and coextensive relationship,
   (A) a first non-diffuse filter element which transmits radiation in a continuous spectrum of wavelengths within a first wavelength band and which absorbs radiation in a continuous spectrum of wavelengths within a second wavelength band, said first and second wavelength bands being distinct and contiguous and within the wavelength spectrum $\lambda_0-\lambda_v$ with said first wavelength band comprising relatively shorter wavelengths, and
   (B) a second non-diffuse filter element which includes fluorescent material that emits radiation of wavelengths within said second wavelength band and absorbed by said first filter element in response to excitation by incident radiation of wavelengths within said first wavelength band, said fluorescent material being absorptive of radiation of wavelengths within said first wavelength band transmitted by said first filter element resulting in excitation of said fluorescent material.

2. A radiation filter device according to claim 1 wherein said second filter element is absorptive of radiation of all wavelengths within said first wavelength band.

3. A radiation filter device according to claim 1 wherein said first filter element transmits radiation of all wavelengths within said first wavelength band and absorbs radiation of all wavelengths within said second wavelength band.

4. A radiation filter device according to claim 3 wherein said second filter element is absorptive of radiation of all wavelengths within said first wavelength band.

5. A radiation filter device according to claim 1 wherein said first and second wavelength bands are coextensive with the wavelength spectrum $\lambda_0-\lambda_v$.

6. A radiation filter device according to claim 1 wherein the radiation emitted by said fluorescent material is of wavelengths which are at least partly within the visible light spectrum.

7. A radiation filter device according to claim 1 which includes a third non-diffuse filter element disposed adjacent to said second filter element with said second filter element positioned intermediate said first and third elements, said third filter element being absorptive of radiation of all wavelengths within said first wavelength band and transmissive of radiation of wavelengths within said second wavelength band with the radiation wavelengths transmitted at least including radiation wavelengths emitted by said fluorescent material.

8. A radiation filter device according to claim 7 wherein said first filter element transmits radiation of all wavelengths within said first wavelength band and absorbs radiation of all wavelengths within said second wavelength band.

9. A radiation filter device according to claim 7 wherein said first and second wavelength bands are coextensive with the wavelength spectrum $\lambda_0-\lambda_v$.

10. A radiation filter device according to claim 7 wherein the wavelengths of radiation emitted by said fluorescent material are at least partly within the visible light spectrum.

11. A radiation filter device according to claim 1 which includes a third filter element disposed adjacent to said second filter element with said second filter element positioned intermediate said first and third filter elements, said third filter element being absorptive of radiation of all wavelengths other than wavelengths of radiation emitted by said fluorescent material and transmissive of radiation of wavelengths emitted by said fluorescent material.

References Cited

UNITED STATES PATENTS 3,243,595  3/1966  Allington _____ 350—316

A. R. BORCHELT, Primary Examiner

U.S. Cl. X.R.

250—71; 350—1, 316